United States Patent
Thompson et al.

(10) Patent No.: US 8,593,160 B2
(45) Date of Patent: Nov. 26, 2013

(54) APPARATUS AND METHOD FOR FINGER ACTIVITY ON A FINGERPRINT SENSOR

(75) Inventors: Erik Jonathon Thompson, Phoenix, AZ (US); Gregory Lewis Dean, Phoenix, AZ (US); Jaswinder Jandu, Chandler, AZ (US); Richard Alexander Erhart, Tempe, AZ (US)

(73) Assignee: Validity Sensors, Inc., San Jose, CA (US)

( * ) Notice: Subject to any disclaimer, the term of this patent is extended or adjusted under 35 U.S.C. 154(b) by 0 days.

(21) Appl. No.: 13/614,665

(22) Filed: Sep. 13, 2012

(65) Prior Publication Data

US 2013/0021044 A1  Jan. 24, 2013

Related U.S. Application Data

(63) Continuation of application No. 12/354,722, filed on Jan. 15, 2009, now Pat. No. 8,278,946.

(51) Int. Cl.
*G01R 27/26* (2006.01)

(52) U.S. Cl.
USPC .......... 324/658; 324/661; 324/666; 324/667; 324/686; 382/124; 345/173; 345/174; 178/18.06; 178/19.03

(58) Field of Classification Search
USPC ............ 382/124; 345/173–174; 324/658, 686
See application file for complete search history.

(56) References Cited

U.S. PATENT DOCUMENTS

| | | |
|---|---|---|
| 4,151,512 A | 4/1979 | Rigannati et al. |
| 4,225,850 A | 9/1980 | Chang et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,582,985 A | 4/1986 | Lofberg |

(Continued)

FOREIGN PATENT DOCUMENTS

| | | |
|---|---|---|
| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Arleen M Vazquez
*Assistant Examiner* — Son Le
(74) *Attorney, Agent, or Firm* — Greenberg Traurig LLP; Cecily Anne O'Regan; William C. Cray

(57) ABSTRACT

An apparatus and method for detecting the presence of a finger on a fingerprint sensor is disclosed in one embodiment of the invention as including transmitting a probing signal, comprising a series of probing pulses, to a fingerprint sensing area. A response signal, comprising a series of response pulses, is received from the fingerprint sensing area in response to the probing signal. An upper reference signal is generated and finger activity is detected on the fingerprint sensing area by monitoring whether the peaks of the response pulses exceed the reference signal.

20 Claims, 9 Drawing Sheets

(56) References Cited

U.S. PATENT DOCUMENTS

| | | |
|---|---|---|
| 4,675,544 A | 6/1987 | Shrenk |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hsu et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,995,630 A | 11/1999 | Borza |
| 5,999,637 A | 12/1999 | Toyoda et al. |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Sartor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,332,193 B1 | 12/2001 | Glass et al. |
| 6,333,989 B1 | 12/2001 | Borza |
| 6,337,919 B1 | 1/2002 | Dunton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,525,547 B2 | 2/2003 | Hayes |
| 6,525,932 B1 | 2/2003 | Ohnishi et al. |
| 6,539,101 B1 | 3/2003 | Black |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 * | 8/2006 | Benkley, III ............... 382/124 |
| 7,110,574 B2 | 9/2006 | Haruki et al. |
| 7,110,577 B1 | 9/2006 | Tschudi |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 * | 12/2006 | Benkley, III ............... 382/107 |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujeda |
| 7,409,876 B2 | 8/2008 | Ganapathi et al. |
| 7,412,083 B2 | 8/2008 | Takahashi |

(56) References Cited

U.S. PATENT DOCUMENTS

| | | |
|---|---|---|
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,643,950 B1 * | 1/2010 | Getzin et al. ............ 702/60 |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satyan et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hofmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0181521 A1 | 8/2006 | Perrault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |

(56) References Cited

U.S. PATENT DOCUMENTS

| | | |
|---|---|---|
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1* | 7/2008 | Qin et al. .................. 178/18.06 |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1* | 9/2008 | Saito et al. .................. 235/380 |
| 2008/0226132 A1 | 9/2008 | Gardner |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0117794 A1 | 5/2010 | Adams et al. |
| 2010/0119124 A1 | 5/2010 | Satyan |
| 2010/0123657 A1 | 5/2010 | Shimizu |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0083018 A1 | 4/2011 | Kesanupalli et al. |
| 2011/0083170 A1 | 4/2011 | Kesanupalli et al. |
| 2011/0090047 A1 | 4/2011 | Patel |
| 2011/0102567 A1 | 5/2011 | Erhart |
| 2011/0102569 A1 | 5/2011 | Erhart |
| 2011/0175703 A1 | 7/2011 | Benkley |
| 2011/0176037 A1 | 7/2011 | Benkley |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Erhart |
| 2012/0257032 A1 | 10/2012 | Benkley |
| 2012/0308092 A1 | 12/2012 | Benkley et al. |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2474999 B | 2/2013 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |

(56) References Cited

FOREIGN PATENT DOCUMENTS

| | | | |
|---|---|---|---|
| WO | WO 2005/104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] pp. 127-134, paragraph 6.2.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.com (Internet Archive Wayback Machine, www.bellagiodesigns.com date: Oct. 29, 2005).

Galy et al. (Jul. 2007) "A full fingerprint verification system for a single-line sweep sensor." IEEE Sensors J., vol. 7 No. 7, pp. 1054-1065.

\* cited by examiner

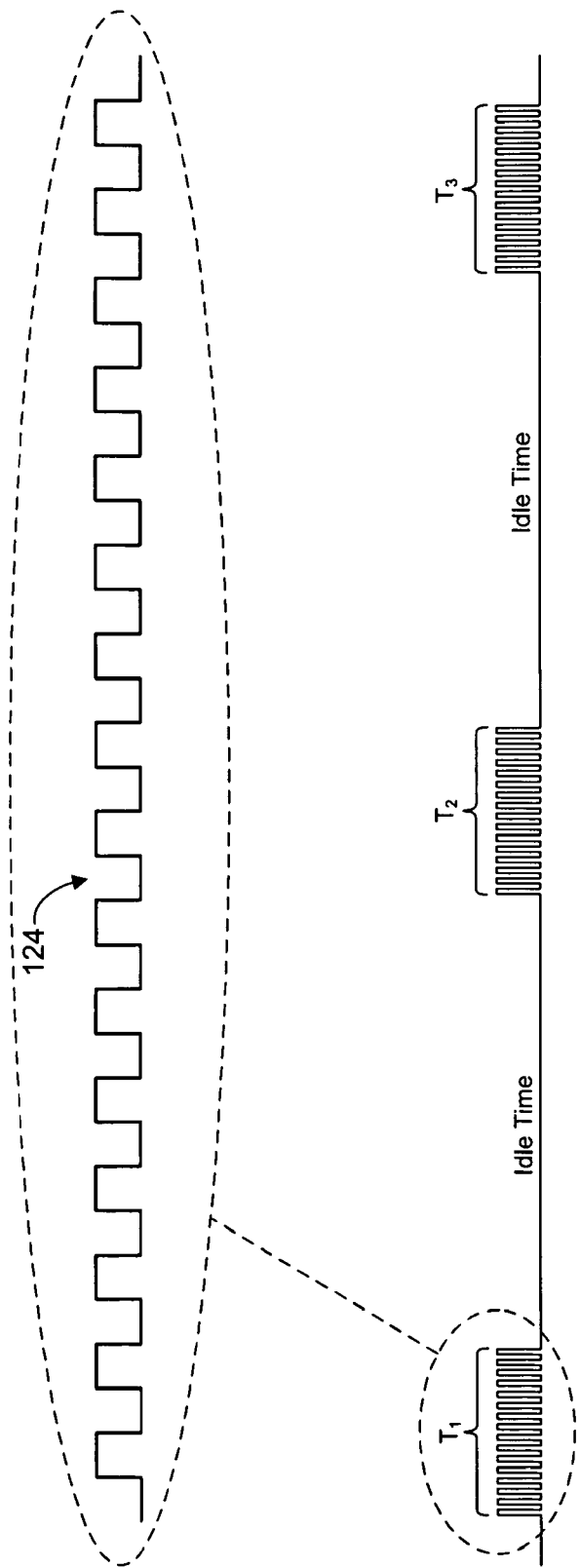
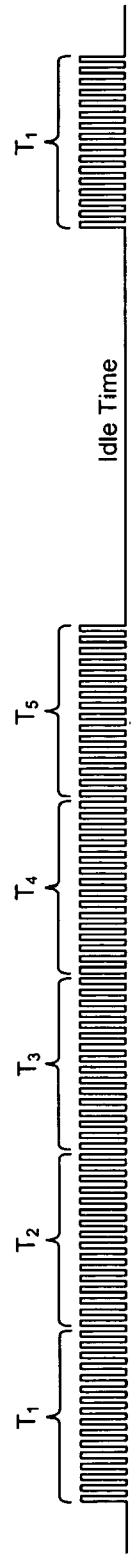
Fig. 9
Fig. 10

APPARATUS AND METHOD FOR FINGER ACTIVITY ON A FINGERPRINT SENSOR

CROSS-REFERENCE

This application is a continuation application of Ser. No. 12/354,722, filed Jan. 15, 2009 now U.S. Pat. No. 8,278,946, which is incorporated herein by reference in its entirety and to which application we claim priority under 35 USC §120.

BACKGROUND

This invention relates to fingerprint sensors and more particularly to apparatus and methods for managing power consumption in fingerprint sensing circuits and also to apparatus and method for detecting finger activity with fingerprint sensing circuits.

Power management is increasingly important in today's mobile electronic devices as greater reliance is placed on batteries and other mobile energy sources. This is true for devices such as portable computers, personal data assistants (PDAs), cell phones, gaming devices, navigation devices, information appliances, and the like. Furthermore, with the convergence of computing, communication, entertainment, and other applications in mobile electronic devices, power demands continue to increase at a rapid pace, with batteries struggling to keep pace. At the same time, even where additional features and capability are provided in modern electronic devices, consumers still desire elegant, compact devices that are small enough to be slipped into a pocket or handbag.

While power management continues to increase in importance, access control is also becoming increasingly important as it relates to modern electronic devices. Access control generally refers to methods and techniques for restricting the ability of a user or program to access a system's resources. Access control is gaining importance at least partly because users are storing increasing amounts of private, sensitive, or confidential information on mobile electronic devices. The electronic devices themselves are also valuable. Thus, restricting access to these devices may provide an effective deterrent to theft or misappropriation by reducing the value of the devices for would-be thieves or resellers.

Although reusable passwords are probably the most common technique for authenticating and identifying a user of a device, various other techniques are also being developed to counter the various ways that reusable passwords may be compromised. For example, fingerprint sensors provide one potential method for identifying and authenticating a user. Fingerprints, like various other biometric characteristics, are based on an unalterable personal characteristic and thus are believed to more reliable to identify a user. Nevertheless, like other features, fingerprint and other biometric sensors typically require additional hardware and software for implementation in electronic devices. This hardware and software adds to the already large power demands being placed on these devices.

In view of the foregoing, what are needed are apparatus and methods for efficiently managing and conserving power in fingerprint sensing circuits. For example, apparatus and methods are needed to significantly reduce power consumed by fingerprint sensing circuits when the circuits are idle or waiting for a user to apply a fingerprint. Further needed are methods and techniques to enable fingerprint sensors to quickly "wake up" when finger or non-finger related activity is detected by the circuit. Further needed are apparatus and methods for determining whether a finger is or is not present on a fingerprint sensor when detection begins.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through the use of the accompanying drawings, in which:

FIG. 9 is a diagram showing one method for timing the probing pulses transmitted to the fingerprint sensing area; and FIG. 10 is a diagram showing another method for timing the probing pulses transmitted to the fingerprint sensing area.

DETAILED DESCRIPTION

Figure 1:
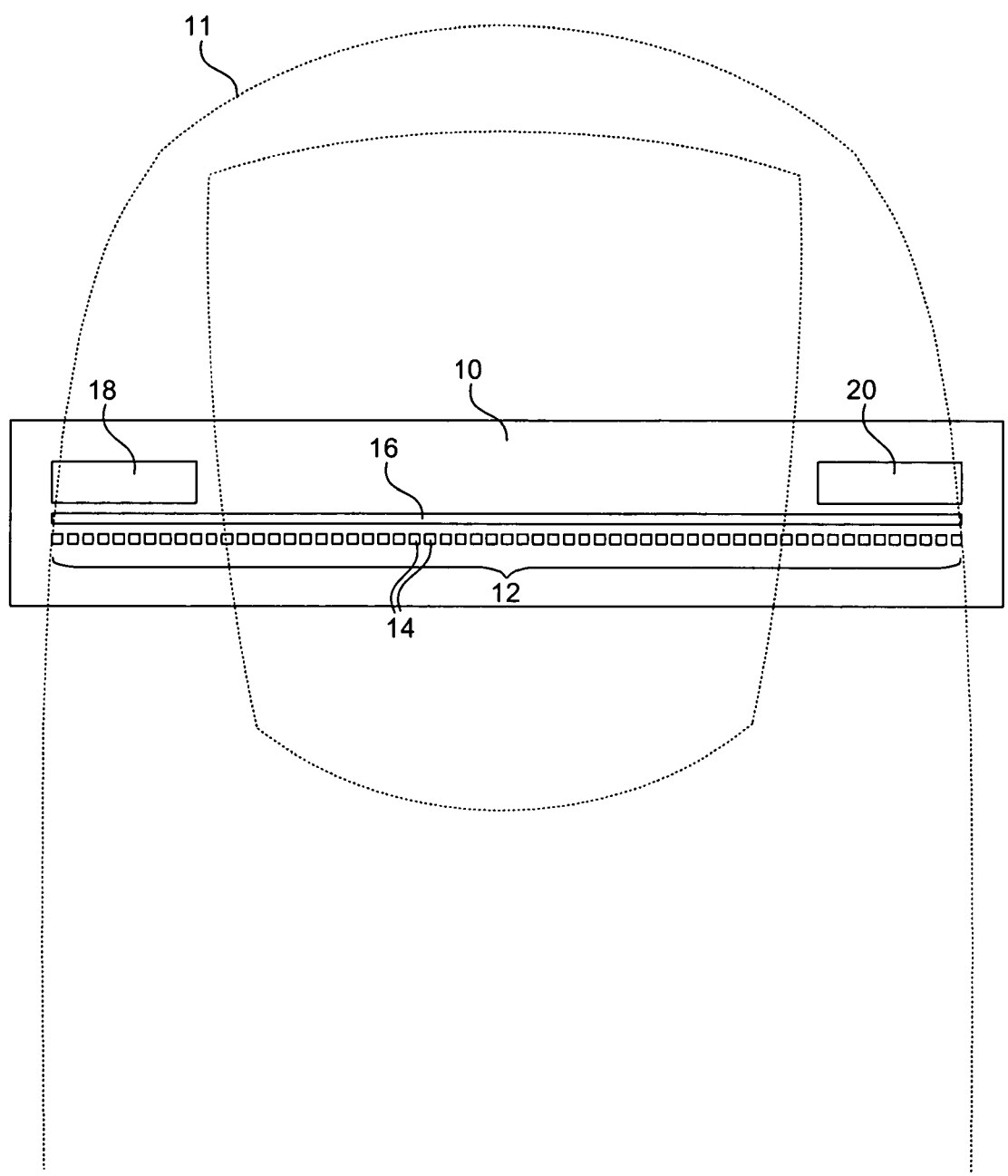
FIG. 1 is a high level block diagram of one embodiment of a fingerprint sensing area associated with a fingerprint sensing circuit in accordance with the invention.

The invention has been developed in response to the present state of the art, and in particular, in response to the problems and needs in the art that have not yet been fully solved by currently available fingerprint sensors. Accordingly, the invention has been developed to provide novel apparatus and methods for managing power consumption in fingerprint sensing circuits. The invention has been further developed to provide novel apparatus and methods for detecting finger activity with fingerprint sensing circuits. The features and advantages of the invention will become more fully apparent from the following description and appended claims and their equivalents, and also any subsequent claims or amendments presented, or may be learned by practice of the invention as set forth hereinafter.

Consistent with the foregoing, a method for detecting the presence of a finger on a fingerprint sensor is disclosed in one embodiment of the invention as including transmitting a probing signal, comprising a series of probing pulses, to a fingerprint sensing area. A response signal, comprising a series of response pulses, is received from the fingerprint sensing area in response to the probing signal. An upper reference signal is generated and finger activity is detected on the fingerprint sensing area by monitoring whether the peaks of the response pulses exceed the reference signal. In selected embodiments, the method includes counting the number of times the peaks exceed the upper reference signal. Accordingly, finger activity may be detected on the fingerprint sensing area based on the number of times the peaks exceed the upper reference signal.

Similarly, in selected embodiments, the method may also include establishing a lower reference signal and monitoring whether the peaks of the response pulses drop below the lower reference signal. Removal of a finger from the fingerprint sensing area may be detected by monitoring whether the peaks of the response pulses drop below the lower reference signal. In selected embodiments, the method includes counting the number of times the peaks drop below the lower reference signal. Accordingly, removal of a finger from the fingerprint sensing area may be detected based on the number of times the peaks drop below the lower reference signal.

In another embodiment of the invention, an apparatus for detecting the presence of a finger on a fingerprint sensor includes a transmitter element to emit a probing signal comprising a series of probing pulses at a fingerprint sensing area. A receiving element receives a response signal comprising a series of response pulses from the fingerprint sensing area in response to the probing signal. A signal generator is provided to generate an upper reference signal. A detector monitors whether the peaks of the response pulses exceed the upper reference signal. Similarly, detection logic may determine whether a finger has been placed on the fingerprint sensing area based on whether the peaks exceed the upper reference signal. In selected embodiments, the apparatus further includes a counter to count the number of times the peaks exceed the upper reference signal. Similarly, the detection logic may detect finger activity based on the number of times the peaks exceed the upper reference signal.

In selected embodiments, the apparatus may also include a second signal generator to generate a lower reference signal. The detector may monitor whether the peaks drop below the lower reference signal. Detection logic may determine whether a finger has been removed from the fingerprint sensing area based on whether the peaks drop below the lower reference signal. In selected embodiments, a counter may count the number of times the peaks drop below the lower reference signal. Similarly, the detection logic may determine whether a finger has been removed from the fingerprint sensing area based on the number of times the peaks drop below the lower reference signal.

In yet another embodiment of the invention, an apparatus for detecting the presence of a finger on a fingerprint sensor includes means for transmitting a probing signal comprising a series of probing pulses to a fingerprint sensing area. The apparatus further includes means for receiving a response signal comprising a series of response pulses from the fingerprint sensing area in response to the probing signal. The apparatus further includes means for establishing an upper reference signal and means for monitoring whether the peaks of the response pulses exceed the upper reference signal.

Similarly, in selected embodiments, the apparatus may also include means for establishing a lower reference signal and monitoring whether the peaks of the response pulses drop below the lower reference signal. Removal of a finger from the fingerprint sensing area may be detected by monitoring whether the peaks of the response pulses drop below the lower reference signal. In selected embodiments, the apparatus may further include means for counting the number of times the peaks drop below the lower reference signal. Accordingly, removal of a finger from the fingerprint sensing area may be detected based on the number of times the peaks drop below the lower reference signal.

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Referring to FIG. 1, in selected embodiments, a fingerprint sensor in accordance with the invention may include fingerprint sensing area 10 to provide a surface onto which a user can swipe a fingerprint. A dotted outline of a finger 11 is shown superimposed over the fingerprint sensing area 10 to provide a general idea of the size and scale of the fingerprint sensing area 10. In certain embodiments, the fingerprint sensing area 10 may include an array 12 of transmitting elements 14, such as a linear array 12 of transmitting elements 14, to assist in scanning a fingerprint as it is swiped across the fingerprint sensing area 10. The transmitting elements 14 are not drawn to scale and may include several hundred elements 14 arranged across the width of a fingerprint. A fingerprint image may be created by scanning successive lines of a finger as it is swiped over the array 12, similar to the way a fax image is captured using line-by-line scanning.

In certain embodiments, each transmitting element 14 may successively emit a probing signal, one after the other. As will be explained in more detail hereafter, the probing signal may include a series of probing pulses, such as a series of square waves. A square wave may be used because it is simple waveform that is easy to generate.

In certain embodiments, the probing signal emitted by each transmitting element 14 may be detected on the receiving end by a receiving element 16. In selected embodiments, pairs of receiving elements 16 may be used to cancel out noise. Like the probing signal, the response signal may include a series of response pulses generated in response to the probing pulses. The magnitude of the response signals may depend on factors such as whether a finger is present over the fingerprint sensing area 10 and, more particularly, whether a ridge or valley of a fingerprint is immediately over the transmitting element 14. The magnitude of the signal received at the receiving element 16 may be directly related to the RF impedance of a finger ridge or valley placed near the gap between the transmitting element 14 and the receiving element 16.

Instead of using a separate receiving element 16 for each transmitting element 14, a single receiving element 16 may be used where the transmitting elements 14 transmit the probing signal at different times. The response signals received by the receiving element 16 may then be correlated with each transmitting element 14 on the receiving end. By using a single receiving element 16, the receiver that is coupled to the receiving element 16 may be designed to be very high quality and with a much better dynamic range than would be possible using an array of multiple receiving elements.

The design described above differs from many conventional fingerprint sensors, which may employ a single large transmitting element with a large array of receiving elements and receivers. Nevertheless, many of the power management and finger detection features described herein are not limited to the illustrated transmitter and receiver design. Indeed, the apparatus and methods disclosed herein may be used with fingerprints sensors using a small number of transmitting elements and a relatively large number of receiving elements, a large number of transmitting elements and a relatively small number of receiving element, or a roughly equal number of transmitting elements and receiving elements.

In selected embodiments, the fingerprint sensing area 10 (including the transmitting and receiving elements 14, 16) may be physically decoupled from the fingerprint sensing integrated circuit, as will be described in more detail in FIG. 2. This may enhance the reliability of the fingerprint sensor by reducing the mechanical fragility and susceptibility to electrostatic discharge that are commonly associated with direct contact silicon fingerprint sensors. Positioning the sensing elements off the silicon die also allows the cost of the sensor to be reduced over time by following a traditional die-shrink roadmap. This provides a distinct advantage over direct contact sensors (sensors that are integrated into the silicon die) which cannot be shrunk to less than the width of an industry standard fingerprint. Nevertheless, the power management and finger detection features disclosed herein may be applicable to fingerprint sensors with sensing elements that are located either on or off the silicon die.

In certain embodiments, the fingerprint sensing area 10 may include one or more transmitting and receiving elements 18, 20 to "wake up" the fingerprint sensing circuit when a user swipes a finger over the fingerprint sensing area 10. These elements may stay active when other elements (e.g., elements 14, 16) have been turned off, disabled, or have been put into a sleep or hibernation mode. Although only two elements 18, 20 are shown, the fingerprint sensing area 10 may include additional transmitting and/or receiving elements placed at various locations on the fingerprint sensing area 10. Like the transmitting and receiving elements 14, 16, the elements 18, 20 may be used to wake up the fingerprint sensing circuit by detecting changes in impedance when a finger is placed or swiped over the fingerprint sensing area 10.

In selected embodiments, certain elements 18, 20 may be dedicated to waking up the fingerprint sensor while other elements 14, 16 may be dedicated to scanning fingerprints. In other embodiments, one or more of the elements 14, 16, 18, 20 may double as "wake up" elements and fingerprint scanning elements. For example, a small subset of the transmitting and receiving elements 14, 16 may be kept active even as other elements 14, 16 are turned off or put into sleep mode. When finger activity is detected by the small subset, the remainder of the transmitting and receiving elements may be woken up to begin scanning a fingerprint. In selected embodiments, the fingerprint sensing circuit may be programmable to allow different fingerprint sensing elements 14, 16 to be used as "wake up" elements.

Figure 2:
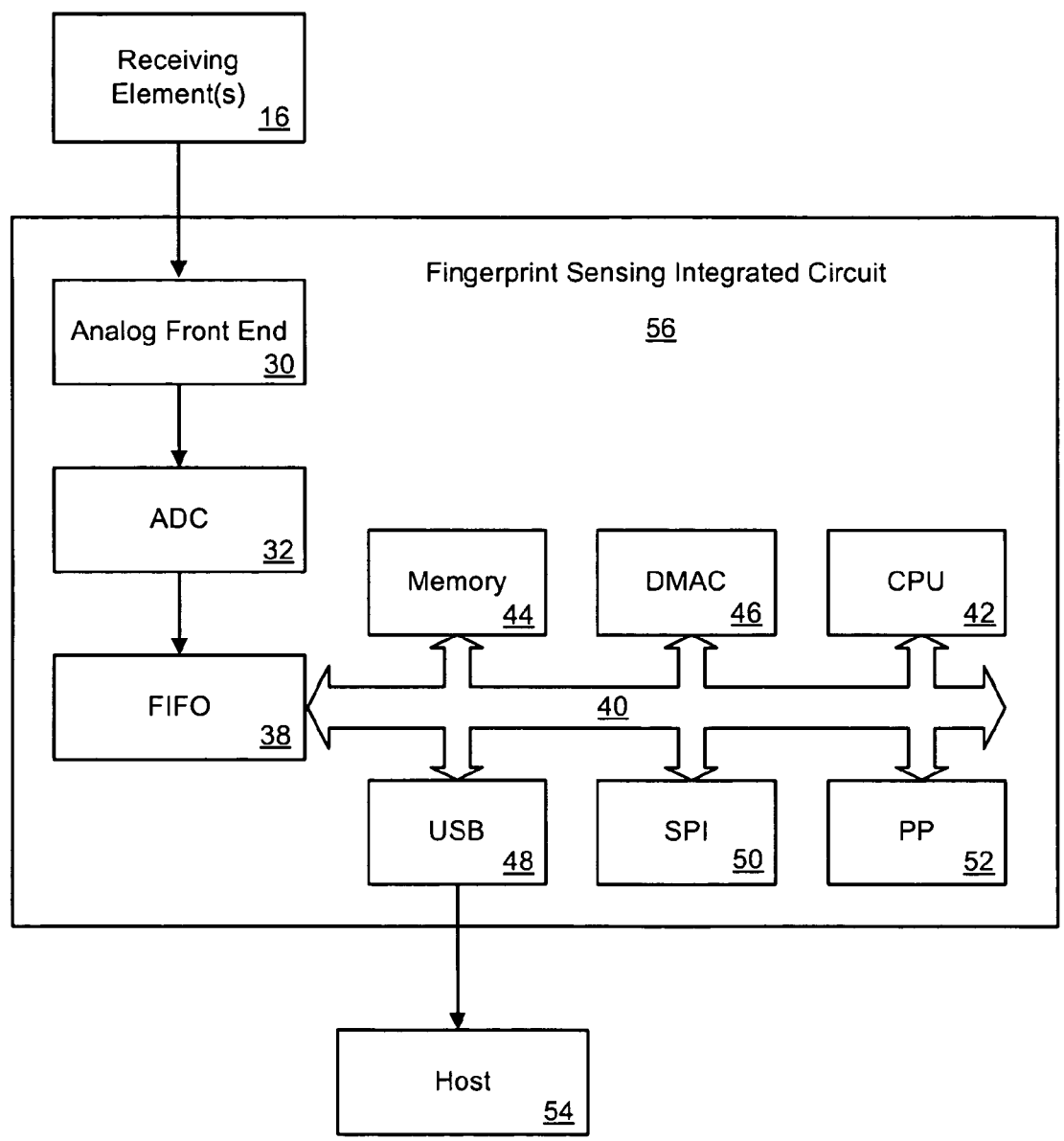
FIG. 2 is a high level block diagram showing various components that may be associated with the flow of data through the fingerprint sensing circuit.

Referring to FIG. 2, in selected embodiments, the response signal received by the receiving element(s) 16 may be received by an analog front end 30, where it may be amplified and/or passed through various filters to remove noise or other unwanted components from the signal. The amplified and/or filtered analog signal may then be passed to an analog-to-digital converter (ADC) 32, where it may be converted to a sequence of bits. For example, in selected embodiments, the response signal may be converted to a string of bytes (or a "line" of data), one byte for each transmitting element 14 in the array 12. Each byte may represent one of 256 (i.e., $2^8$) possible values depending on the magnitude of the response signal received for each transmitting element 14. As mentioned previously, the magnitude of the response signal may depend on factors such as whether a finger is placed over the fingerprint sensing area 10 and more specifically whether a ridge or valley of a fingerprint is present over a transmitting element 14.

Digital data output by the ADC 32 may then be stored in a FIFO buffer 38. The FIFO 38 may be coupled to a bus 40, which may communicate with various components, such as a CPU 42, memory 44, direct memory access controller 46, and the like. The bus 40 may also communicate with one or more interfaces, such as a USB interface 48, Serial Peripheral Interface (SPI) interface 50, parallel port (PP) interface 52, or the like. The FIFO 38 may provide a data storage medium to compensate for differences in timing and transfer rate between the components 30, 32, 38 and the components 42, 44, 46, 48, 50, 52.

In selected embodiments, some or all of the components illustrated in FIG. 2 may be implemented in an integrated circuit 56. This integrated circuit 56 may communicate with a host system 54 through one or more of the interfaces 48, 50, 52. The host system 54, for example, may process the fingerprint data using various matching algorithms in order to authenticate a user's fingerprint.

Figure 3:
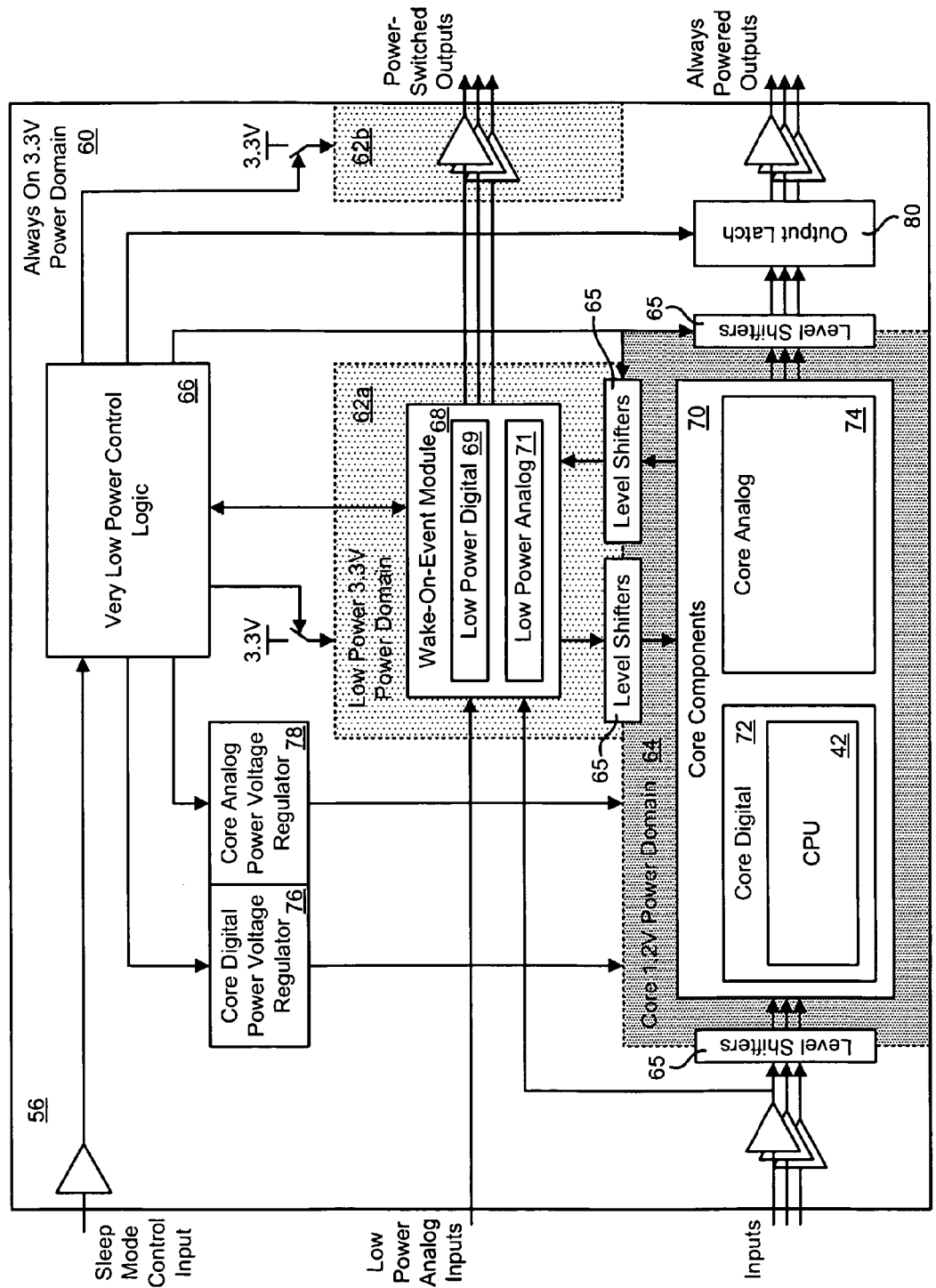
FIG. 3 is a high level block diagram of various components and power domains that may be associated with an integrated fingerprint sensing circuit in accordance with the invention.

Referring to FIG. 3, as mentioned previously, incorporating a fingerprint sensor or other biometric sensor into an electronic device typically requires use of additional hardware and software. This hardware and software increases the power demands already placed on batteries or other energy sources for an electronic device. Thus, it would be an improvement in the art to significantly reduce the power that is consumed by a fingerprint sensing circuit in accordance with the invention.

In selected embodiments in accordance with the invention, the integrated circuit 56 described in FIG. 2 may be divided into various power domains in an effort to reduce the power that is consumed by the integrated circuit 56. For example, the integrated circuit 56 may be divided into an "always on" power domain 60, a "low" power domain 62, and a "core" (or primary) power domain 64. Electrical power supplied to each of these power domains may be selectively turned on/off or enabled/disabled to put the integrated circuit 56 into various power modes or levels of activity.

As will be explained in more detail hereafter, the power domains 60, 62, 64 may, in certain embodiments, operate at different voltages. For example, components within the "always on" and "low" power domains 60, 62 may operate at 3.3V (the voltage supplied to the integrated circuit 56), whereas components within the "core" power domain may operate at 1.2V. Level shifters 65 may be placed between the power domains 60, 62, 64 operating at different voltages to change the voltage of signals transmitted therebetween. Although the higher operating voltages of the "always on" and "low" power domains 60, 62 may require use of larger components (e.g., transistors, resistors, etc.), which may increase power consumption, the increased power consumption may be offset by eliminating voltage regulators needed to reduce the operating voltage. That is, by eliminating the voltage regulators for the "always on" and "low" power domains 60, 62, the net power consumption may be reduced even while using larger, less efficient components (assuming that the number of larger components is relatively small).

In certain embodiments, the "always on" power domain 60 may include very low power control logic 66 which may remain operational even when other portions of the integrated circuit 56 are turned off or disabled. In certain embodiments, the "low" power domain 62 may include a "wake-on-event" module 68 which may listen for finger or non-finger activity and wake up other parts of the circuit 56 (e.g., core components 70) when such activity is detected. The "wake-onevent" module 68 may include both low power digital components 69 and analog components 71, as will be explained in more detail hereafter. The "core" power domain 64 may include core components 70, which may include core digital components 72 and core analog components 74. Core digital components 72, for example, may include the CPU 42, memory 44, DMAC 46, and other digital components. The core components 70 may comprise the largest portion of the circuit 56 and may provide most of the processing power for the circuit 56.

In certain embodiments, the very low power control logic 66 may control the power supply to each of the power domains 60, 62, 64. For example, the very low power control logic 66 may turn power on and off to components in the low power domain 62. The very low power control logic 66 may also control the power supply to voltage regulators 76, 78, which may reduce the operating voltage from 3.3V to 1.2V to power the core components 70. These regulators 76, 78, in selected embodiments, may include a core digital and core analog voltage regulator 76, 78, each of which may be turned on and off independently. By controlling power supplied to the regulators 76, 78, the core analog and core digital components may be turned on or off as needed.

In certain embodiments, output latches 80 may be provided to latch or gate output values to fixed states when the components within particular power domains are powered off. That is, when components within a particular power domain are powered off, the outputs from these components may "float" or assume uncertain states that may confuse downstream components, which may be unaware that the upstream components are powered off. To correct this problem, the outputs may be latched or gated to fixed states to avoid confusion or erratic behavior that may result when various power domains or components are powered off.

Figure 4:
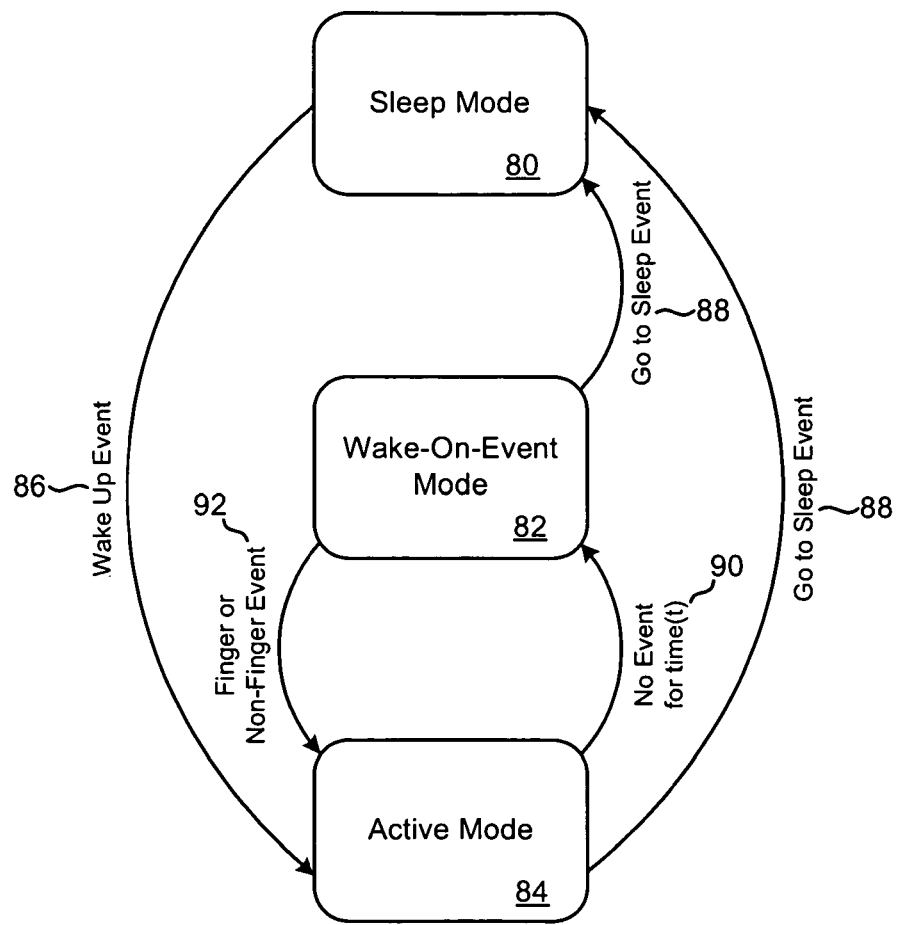
FIG. 4 is a state diagram showing various different power modes, and events for transitioning between the power modes, that may be associated with a fingerprint sensing circuit in accordance with the invention.

Referring to FIG. 4, while continuing to refer generally to FIG. 3, the integrated circuit 56 may operate in one of several modes, or states of operation, which may affect the power supplied to the power domains 60, 62, 64. For example, the integrated circuit 56 may operate in one of a sleep mode 80, a "wake-on-event" mode 82, and an active mode 84.

Sleep mode 80 may refer to the circuit's lowest level of hibernation or inactivity and may provide the lowest power consumption. In this mode 80, the "low" power domain 62 and "core" power domain 64 (both the analog portion 74 and digital portion 72) may be turned off. Furthermore, the 1.2V and 3.3V level shifters 65 may be disabled and the outputs may be latched or gated to fixed states. In sleep mode 80, the fingerprint sensing elements (i.e., the transmitting and receiving elements 14, 16, 18, 20) may be shut down such that they are neither transmitting nor receiving. As a result, finger activity over the fingerprint sensing area 10 will go undetected and thus have no effect on the fingerprint sensor.

"Wake-on-event" mode 82 may correspond to a slightly greater level of activity and power consumption compared to sleep mode 80, while still leaving most of the circuit 56 (i.e., the core components 70) turned off. Thus, "wake-on-event" mode 82 may be similar to sleep mode 80 in that it consumes very little power, while providing some additional features not provided by sleep mode 80. In "wake-on-event" mode 82, the "low" power domain 62 may be turned on while the "core" power domain 64 (both the analog portion 74 and digital portion 72) may be turned off. The 1.2V and 3.3V level shifters may be disabled and the outputs may be latched or gated to fixed states. In general, the "wake-on-event" mode 82 may differ from sleep mode 80 in that finger activity over the fingerprint sensing area 10 may be detected and used to wake up the rest of the circuit 56.

As will be explained in more detail in association with FIG. 9, "wake-on-event" mode 82 may alternate between two sub-modes to reduce power consumption even further. These sub-modes may include (1) a lower power "wait for event" sub-mode where the low power analog components 71 in the wake-on-event module 68 are disabled and the power domain 62b for the switched outputs is turned off; and (2) a higher power "sensing" sub-mode where the low power analog components 71 are enabled and the power domain 62b for the switched outputs is turned on.

When operating in the "sensing" sub-mode, a relatively small number of fingerprint sensing elements (i.e., the transmitting and receiving elements 14, 16, 18, 20) may be kept active to sense activity over the fingerprint sensing area 10 and wake up the circuit 56 and the remaining fingerprint sensing elements. When operating in the "wait for event" sub-mode, the fingerprint sensing elements may be turned off while the "wake-on-event" module 68 may continue to listen for non-finger activity such as General Purpose Input/Output (GPIO) activity, USB activity, SPI activity, parallel port activity, the expiration of one or more timers, or the like. Non-finger activity, like finger activity, may be used to wake up the circuit (e.g., the core components 70) and the remaining fingerprint sensing elements in order to read a fingerprint. In selected embodiments, the integrated circuit 56 may be programmable with respect to the type of activity that will wake up the core components 70.

Although the lowest power may be achieved when all non-essential components (including the CPU 42) are turned off, in selected embodiments the CPU 42 may be kept active in wake-on-event mode 82. If desired, other core components 70, such as the memory 44 or DMAC 46 may be disabled or turned off completely to conserve power. By keeping the CPU 42 active, the CPU 42 may be available for quick response and/or calibration. This may allow the CPU 42 to respond more rapidly to events by eliminating the need to power up and go through initialization routines. As will be explained in more detail in association with FIGS. 6 through 9, this may also allow faster calibration of the upper and lower references signals and amplifier gains.

In active mode 84, various core components 70, most notably the CPU 42, may be turned on to resume normal, full power operation. This may significantly raise power consumption while also significantly increasing the functionality of the circuit 56. Unlike the other two modes 80, 82, the 1.2V and 3.3V level shifters may be enabled and the outputs may be opened (i.e., not latched or gated to fixed states). Like the "wake-on-event" mode 82, the active mode 84 may include various sub-modes. These sub-modes may include (1) a lower power "idle" sub-mode where the core digital components 72 (e.g., the CPU 42, the memory 44, etc.) are turned on but the core analog components 74 (e.g., the analog front end 30, ADC 32, etc.) are turned off; and (2) a higher power "scanning" sub-mode where both the core digital components 72 and core analog components 74 are turned on. The "scanning" sub-mode may be used to scan a fingerprint and the "idle" sub-mode may be used during periods where scanning is not performed, will imminently be performed, has just ended, or the like, such that the analog components 74 are not needed but the CPU 42 is still turned on or active.

Various events may cause the circuit 56 to transition between each of the modes 80, 82, 84. For example, a "wake up" event may cause the circuit 56 to transition from sleep mode 80 directly to active mode 84. For example, if a fingerprint sensor is implemented in a "flip type" cell phone, opening up the cell phone may expose the fingerprint sensor and may be considered a "wake up" event 86 to wake up the fingerprint sensor and put it into active mode 84. This will cause the fingerprint sensor to begin scanning the fingerprint sensing area 10 for a fingerprint. Similarly, closing the cell phone may be considered a "go to sleep" event 88 which may cause the circuit 56 to transition back to sleep mode 80. Such a transition 88 may occur, for example from either the active mode 84 or the wake-on-event mode 82.

On the other hand, if the cell phone is left open (with the fingerprint sensor exposed), but the sensor has not detected finger activity for some time (t), the circuit 56 may transition 90 from active mode 84 to "wake-on-event" mode 82. This will cause the circuit 56 to transition to a much lower power state while still retaining the ability to listen for finger or non-finger activity. More specifically, the wake-on-event module 68 may take control of the circuit 56 and shut off power to the core components 70, including the CPU 42, to eliminate or reduce both switching and leakage current in the core components 70.

On the other hand, if the wake-on-event module 68 detects finger or non-finger activity (i.e., a finger or non-finger event 92), the circuit 56 may transition 92 back to active mode 84. More specifically, the wake-on-event module 68 may turn on power to the core components 70 and pass control back to the CPU 42. By shutting down the primary logic portion (e.g., the core components 70) of the integrated circuit 56 and passing control to a secondary logic portion (e.g., the wake-on-event module 68) during periods of inactivity, very low power consumption may be achieved. In fact, an integrated circuit 56 operating in the manner described herein has been shown to consume less then 10 μA (usually 5-6 μA) when operating in wake-on-event mode 82.

The illustrated modes 80, 82, 84, including the sub-modes discussed herein, and the events 86, 88, 90, 92 used to transition between the modes 80, 82, 84, simply provide one example of various modes and events that may be used with an integrated circuit 56 in accordance with the invention. Thus, the illustrated example is not intended to be limiting. Indeed, the modes, names of the modes, components and power domains effected by the modes, and events used to transition between the modes, may be modified, added to, or subtracted from, as needed, without departing from the principles and characteristics of the invention as described herein.

Figure 5:
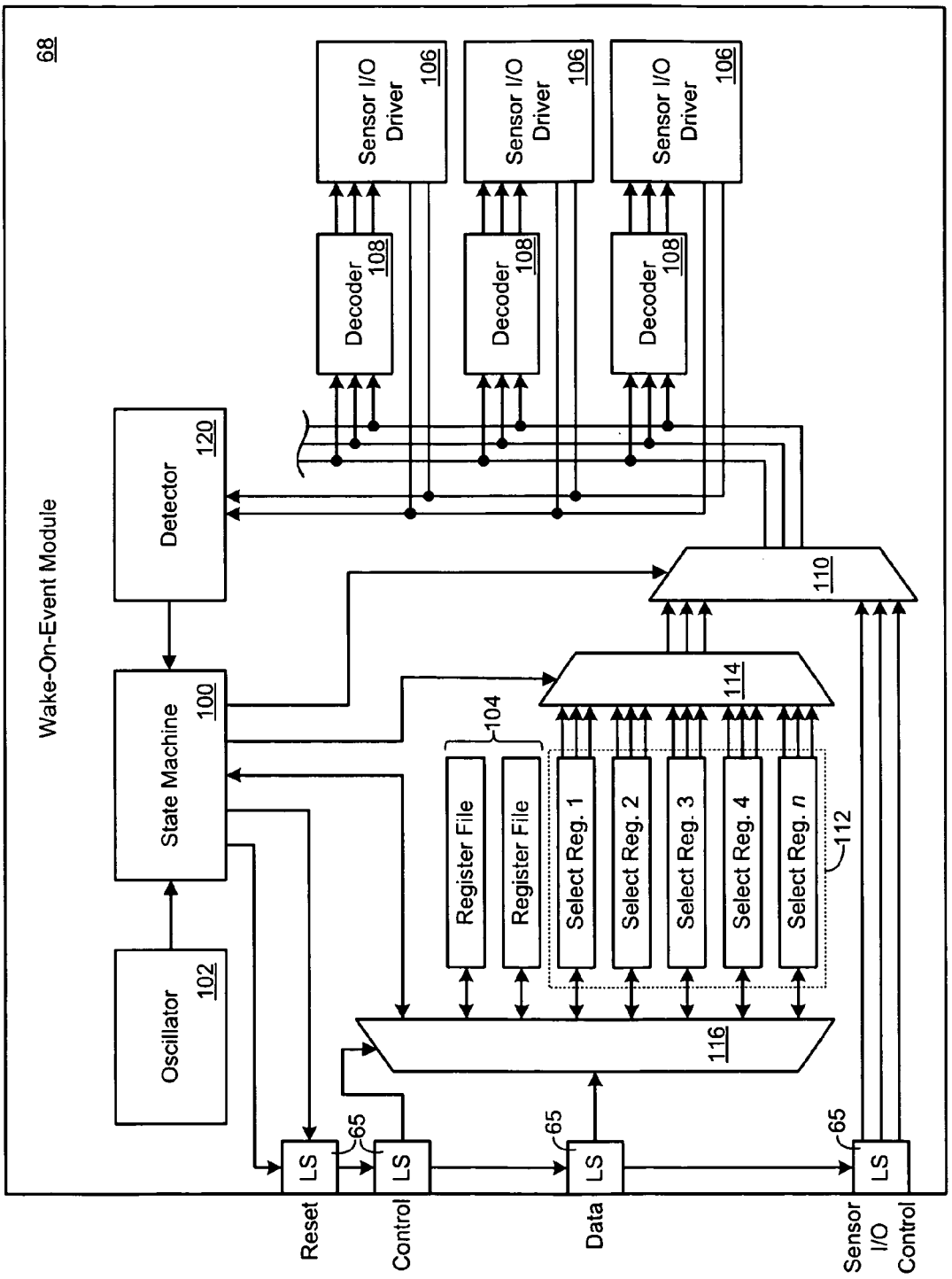
FIG. 5 is a high level block diagram of one embodiment of a "wake-on-event" module, for use in a fingerprint sensing circuit in accordance with the invention.

Referring to FIG. 5, one embodiment of a wake-on-event module 68 is illustrated. In selected embodiments, a wake-on-event module 68 in accordance with the invention may include a state machine 100 to provide the logic for the wake-on-event module 68. The state machine 100 may be coupled to an ultra low power oscillator 102 to provide a clock signal to the state machine 100. The state machine 100 may control the operation of the circuit 56 when in wake-on-event mode 82, including controlling when to turn on power to the core components (e.g., the CPU 42) and pass control back to the CPU 42. As will be explained in more detail in FIG. 6, the wake-on-event module 68 may also include an analog detector 120 to detect finger activity over the fingerprint sensing area 10.

In selected embodiments, before the CPU 42 is turned off, the CPU 42 may be configured to send various types of data (e.g., settings, calibration values, security values, etc.) to the state machine 100 for retrieval at a later time. This is because the CPU 42 and memory 44 may be powered down and thus may be unable to retain any data when in wake-on-event mode 82. This data may be saved in one or more persistent registers 104 in the wake-on-event module 68 when the CPU 42 is powered down. The CPU 42 may retrieve this data from the registers 104 when power is turned back on in order to start up and initialize correctly.

The wake-on-event module 68 may also communicate with sensor I/O drivers 106 that interface with the transmitting and receiving elements 14, 16, 18, 20. These sensor I/O drivers 106 may be shared by the wake-on-event module 68 and the CPU 42 and may be programmable to function as either transmitters or receivers. A sensor I/O driver 106 may be provided for each transmitting and receiving element 14, 16, 18, 20 in the fingerprinting sensing area 10. The wake-on-event module 68 and CPU 42 may use decoders 108 to select which sensor I/O drivers 106 are utilized by the wake-on-event module 68 and CPU 42 respectively.

When in wake-on-event mode 82, the wake-on-event module 68 may take control of the sensor I/O drivers 106. Similarly, when in active mode 84, the CPU 42 may take control of the sensor I/O drivers 106. A multiplexer 110, controlled by the state machine 100, may be used to select whether the state machine 100 or the CPU 42 controls the sensor I/O drivers 106. One or more sensor I/O select registers 112, coupled to a multiplexer 114 (also controlled by the state machine 100) may store data that selects which sensor I/O drivers 106 are configured to transmit and receive when in wake-on-event mode 82.

In selected embodiments, the CPU 42 may communicate with the wake-on-event module 68 through a number of I/O lines. These I/O lines may pass through level shifters 65 due to the difference in operating voltages between the CPU and wake-on-event module power domains. For example, the I/O lines may include "reset," "control," "data," and "sensor I/O control" lines. In selected embodiments, the reset and control I/O lines may communicate with a demultiplexer 116 to select which registers 104, 112 are written to by the CPU 42. The sensor I/O control line(s) may communicate with the decoders 108 by way of the multiplexer 110.

Figure 6:
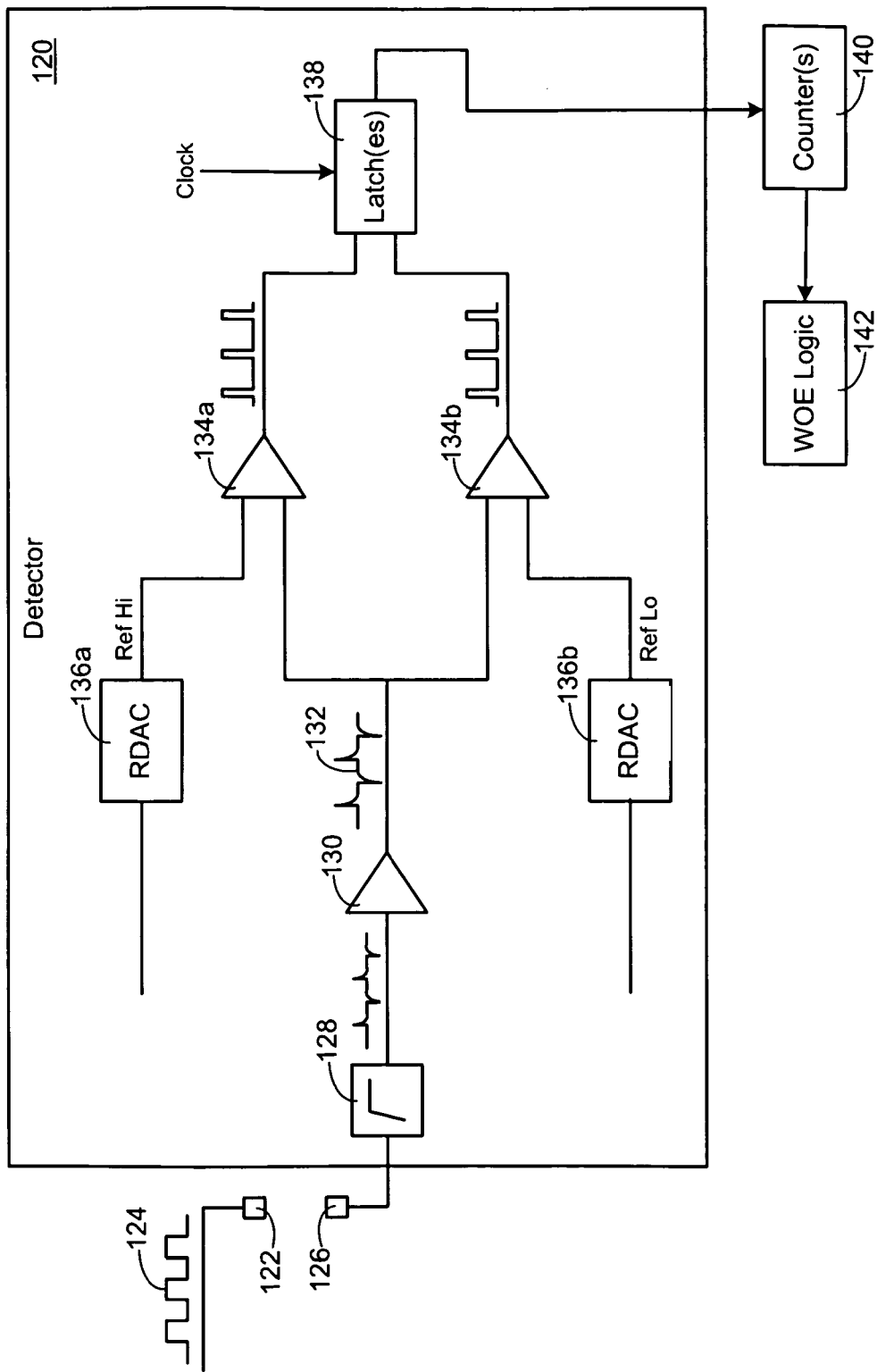
FIG. 6 is a high level block diagram of one embodiment of a detector for use in a "wake-on-event" module in accordance with the invention.

Referring to FIG. 6, one embodiment of a detector 120 for use in the wake-on-event module 68 is illustrated. As shown, a transmitting element 122 (such as an element 14, 16, 18, 20 configured to act as a transmitter) may be configured to emit a probing signal 124 comprising a series of probing pulses. In this example, the probing signal 124 includes a series of square waves. This probing signal 124 may be picked up by a receiving element 126 (such as an element 14, 16, 18, 20 configured to act as a receiver) to generate a response signal.

The response signal may be received by the detector 120 of the wake-on-event module 68. In certain embodiments, the response signal may be passed through various analog components, such as a high pass filter 128 to remove noise, and an amplifier 130. The amplifier 130, and more particularly the high pass filter 128, may generate a response signal 132 that includes a series of response pulses which may resemble a series of sharp peaks. This response signal 132 may be input to a comparator 134a, which may compare the response signal 132 to an upper reference signal, and a comparator 134b, which may compare the response signal 132 to a lower upper reference signal. In selected embodiments, the upper and lower reference signals may be digitally programmed to a desired level using a pair of resistive digital-to-analog converters, or RDACs 136a, 136b.

As will be explained in more detail in FIGS. 7 and 8, upon comparing the response signal 132 to the upper reference signal, the comparator 134a may output a logical high value whenever the response pulses exceed the upper reference signal. Similarly, the comparator 134b may output a logical high value whenever the response pulses exceed the lower reference signal. These high values may be captured by one or more latches 138 so they may be counted 140 by the state machine 100 and, depending on the count, appropriate action may be taken by the wake-on-event logic 142 of the state machine 100.

Figure 7:
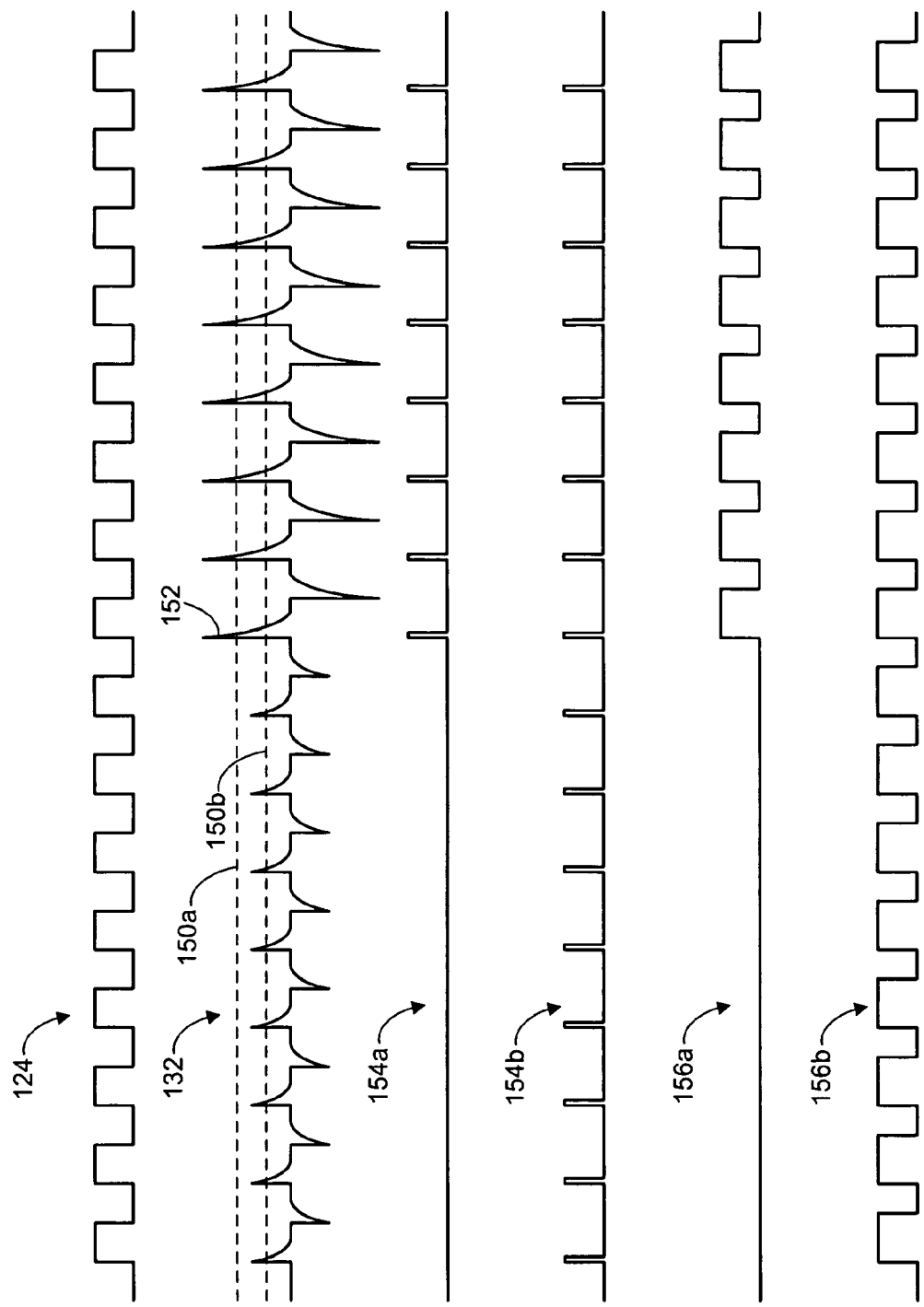
FIG. 7 is a timing diagram showing the relationship between various signals in a fingerprint sensing circuit in accordance with the invention.

Referring to FIG. 7, a timing diagram is provided to show the operation of the wake-on-event module 68, and more specifically the detector 120. As shown, a transmitting element 122 may emit a probing signal 124 comprising a series of square waves. This probing signal 124 may be detected by a receiving element 126, where it may be passed through an amplifier 130 and a high pass filter 128 to generate a response signal 132. As shown, the response signal 132 may comprise a series of response pulses which may resemble a series of sharp peaks. These sharp peaks may correspond to the leading and trailing edges of the square waves 124 (the high frequency component of the square waves) after they pass through the high pass filter 128.

As shown, an upper reference signal 150a may be established above the peaks of the response signal 132 and a lower reference signal 150b may be established below the peaks of the response signal 132. As explained in association with FIG. 6, these references signals 150a, 150b may be generated by the RDACs 136a, 136b. Because the fingerprint sensor may not be able to determine whether a finger was already present on the fingerprint sensing area 10 when sensing begins, the upper reference signal 150a may be used to detect whether a finger is placed on the fingerprint sensing area 10 after the reference signals 150a, 150b were established. The lower reference signal, on the other hand, may be used to detect whether a finger was already present on the fingerprint sensing area 10 but was removed from the fingerprint sensing area 10 after the reference signals 150a, 150b were established. The wake-on-event module 68 may be configured to wake up the circuit 56 for either of these events.

For example, when a user places a finger over the fingerprint sensing area 10, the magnitude of the response signal 132 may increase significantly due to the reduced impedance between the transmitting element and the receiving element. This will cause the magnitude of the response pulses 152 to increase above the upper reference signal 152. When the response pulses 152 increase above the upper reference signal 150a, the comparator 134a may output a high logic value, as shown by the comparator output signal 154a. Similarly, when the magnitude of the response pulses 152 is greater than the lower reference signal 150b, the comparator 134b may also output a high logic value, as shown by the comparator output signal 154b. In this example, the peaks of the response signal 132 always exceed the lower reference signal 150b and thus each response pulse will generate a pulse on the comparator output signal 154b.

As explained previously, the pulses of the comparator output signals 154a, 154b may be captured and held by one or more latches 138. Thus, a first latch output 156a may generate a high value each time a high value is encountered in the comparator output signal 154a. A second latch output 156b may generate a high value each time a high value is encountered in the comparator output signal 154b. These latches 138 may be reset after each pulse so they may be counted by the state machine 100 and be ready to capture and hold the next pulse on the comparator output signals 154a, 154b. After the number of pulses of the first and second latch output signals 156a, 156b have been counted, the number may be processed by the wake-on-event logic 142 in the state machine 100 to take action. Based on the number of pulses that are counted above or below the reference signals 150a, 150b, the wake-on-event module 68 may determine that finger activity has been detected and wake up the circuit 56.

Figure 8:
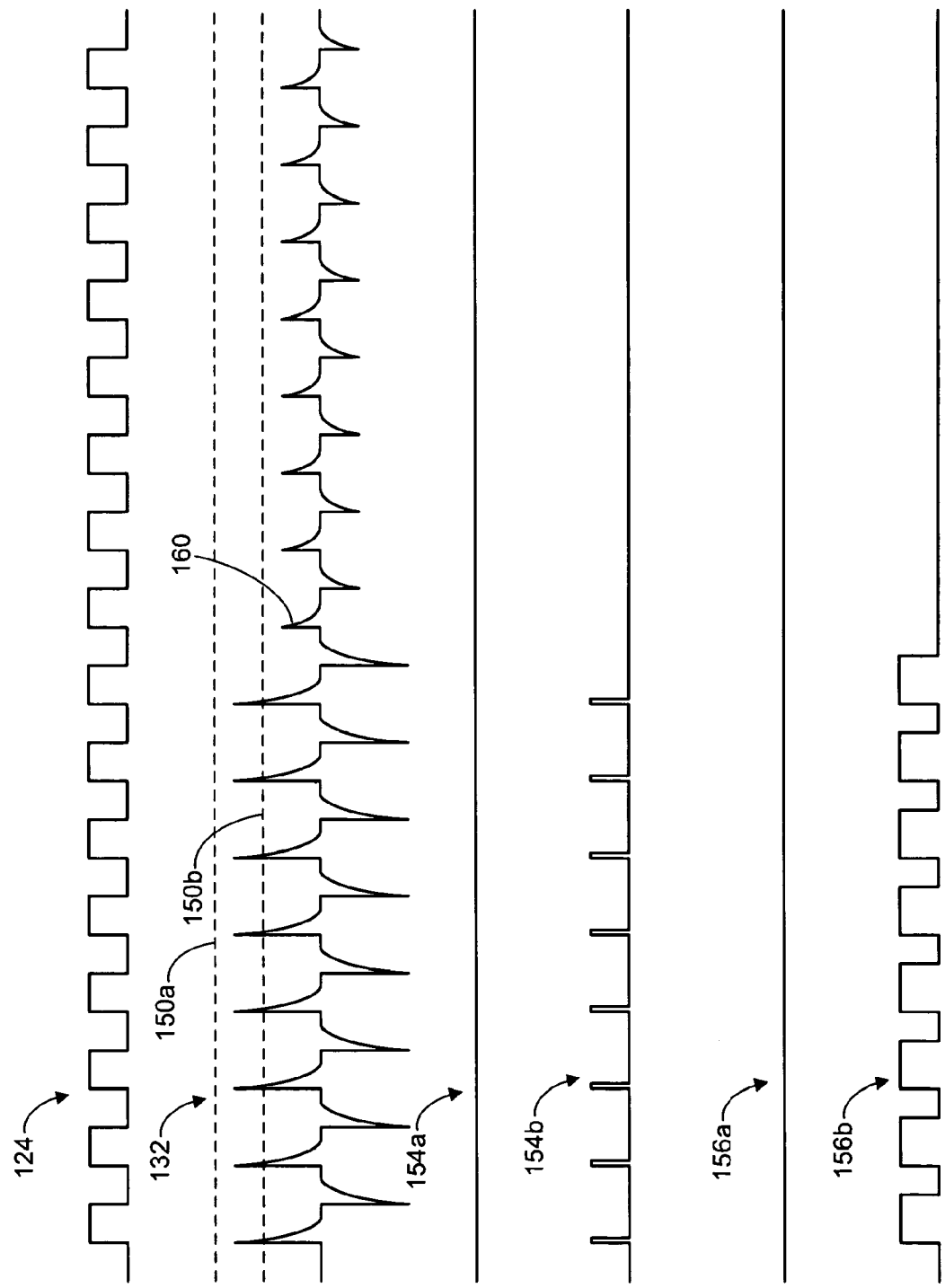
FIG. 8 is another timing diagram showing the relationship between various signals in a fingerprint sensing circuit in accordance with the invention.

Referring to FIG. 8, another example of a timing diagram is illustrated to show the operation of the wake-on-event module 68 and the detector 120. In this example, upper and lower reference signals 150a, 150b are established above and below the peaks of the response signal 132. However, after some duration, the peaks 160 of the response signal 132 fall below the lower reference signal 150b. This may occur where a finger was already present on the fingerprint sensing area 10 when the reference signals 150a, 150b were established, but was removed thereafter. Accordingly, the output 154a from the comparator 134a stays low since none of the peaks exceed the upper reference signal 150a. However, the output 154b from the comparator 134b stays low only after the peaks drop below the lower reference signal 150b. When the outputs 154a, 154b do go high, these values may be captured and held by one or more latches 138, as reflected by the latch output signals 156a, 156b. These high values may then be counted 140 and processed by the wake-on-event logic 142.

Referring to FIG. 9, in selected embodiments, each transmitting element (i.e., $T_1$, $T_2$, $T_3$, etc.) configured to detect finger activity when in wake-on-event mode 82 may periodically transmit a series of probing pulses, such as a series of sixteen pulses, separated by some amount of idle time. That is, idle time may be present between the series of pulses sent to each transmitter. In certain embodiments, the wake-on-event module 68 may include a programmable timer to adjust the amount of idle time between each series of pulses. During the idle time, the wake-on-event module 68 may be put in the lower power "wait for event" sub-mode described in association with FIG. 4. That is, the low power analog components 71 (e.g, the detector 120, the sensor I/O drivers 106, etc.) may be disabled and the power domain 62b for the switched outputs may be turned off.

However, the wake-on-event module 68 may still be configured to detect non-finger activity, such as GPIO activity, USB activity, SPI activity, parallel port activity, or the like, even during the idle time. In selected embodiments, the state machine 100 may include a programmable timer to automatically wake up the core components 70 after a specified amount of time has passed, regardless of whether finger or non-finger activity was detected. By disabling or turning off the analog components 71 during idle time, the power that is consumed by the wake-on-event module 68 during idle time may be significantly reduced.

Conversely, the wake-on-event module 68 may be put in the higher power "sensing" sub-mode when actively transmitting and receiving from the fingerprint sensing area 10. In this sub-mode, the low power analog components 71 may be enabled and the power domain 62b for the switched outputs may be turned on.

Each time the series of probing pulses is transmitted to the fingerprint sensing area 10, the response signal 132 may be compared to the upper and lower references signals 150a, 150b, as described in FIGS. 7 and 8. A counter 140 in the state machine 100 may count the number of times the response is above the upper reference signal 150a and the number of times the response is above the lower reference signal 150b.

If no event occurs (i.e., a finger is neither placed on nor removed from the fingerprint sensing area 10), the counter 140 should count zero responses above the upper reference signal 150a and sixteen responses above the lower reference signal 150b. On the other hand, if a finger is placed over the sensor, the counter 140 should count sixteen responses above the upper reference signal 150a and sixteen responses above the lower reference signal 150b. Similarly, if a finger was already placed on the fingerprint sensor when the sensor enters wake-on-event mode 82 but was then removed, the counter 140 should count zero responses above the upper reference signal 150a and zero responses above the lower reference signal 150b.

These scenarios are the ideal cases where the counter 140 counts either zero or sixteen responses for all cases. In practice, the counter 140 will likely arrive at a number between zero and sixteen due to the effect of noise or other variations in the response signal 132. In selected embodiments, the wake-on-event logic 142 may be programmed to trigger a wakeup for different numbers of response pulses that cross the reference signals 150a, 150b. For example, the wake-on-event logic 142 may be programmed to trigger a wake-up if ten of the sixteen responses are above the upper reference signal 150a. Similarly, the wake-on-event logic 142 may be programmed to trigger a wake-up if four of the sixteen responses are below the lower reference signal 150b. These numbers may be adjusted as needed to account for noise and other signal fluctuations.

As shown in FIG. 9, in other embodiments, the wake-on-event module 68 may be configured to transmit the probing pulses to the transmitting elements back-to-back, separated by idle time. That is, all the transmitting elements may be fired in succession, or in "bursts," followed by idle time between the bursts. Like the previous example, the wake-on-event module 68 may be put in the lower power "wait for event" sub-mode during idle time. Similarly, the wake-on-event module 68 may be put in the higher power "sensing" sub-mode when it is actively transmitting and receiving from the fingerprint sensing area 10.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for detecting the presence of a biometric object on or in the vicinity of a biometric object sensing area in a biometric object imaging apparatus, the method comprising:
   transmitting a probing signal to the biometric object sensing area, comprising a capacitive gap between at least one of a plurality of transmitter electrodes and a single receiver electrode or at least one of a plurality of receiver electrodes and a single transmitter electrode, the probing signal comprising a burst of high frequency pulses, transmitted across the capacitive gap between the at least one of a transmitter electrode from the plurality of transmitter electrodes to the single receiver electrode or to the at least one of a plurality of receiver electrodes from the single transmitter electrode;
   receiving a response signal on the respective receiver electrode in response to the probing signal, the response signal comprising a burst of high frequency pulses;
   establishing an upper reference level for the amplitude of pulses in the burst of high frequency pulses comprising the response signal; and
   monitoring whether the peaks of the response signal exceed the upper reference level to determine the presence of the biometric object in the biometric object sensing area due to the presence of the biometric object modifying the amplitude of the pulses in the burst of high frequency pulses in the response signal from the amplitude of the pulses in the probing signal.

2. The method of claim 1 further comprising:
the amplitude of each pulse in the response signal being determined at least in part by the modification of the high frequency capacitive impedance across the capacitive gap due to the presence of the finger in the vicinity of the capacitive gap.

3. The method of claim 1 further comprising:
establishing a lower reference signal; and
monitoring whether the peaks of the response signal are below the lower reference level to determine the absence of the biometric object in the biometric object sensing area due to the lack of presence of the biometric object modifying the amplitude of the pulses in the high frequency response signal.

4. The method of claim 1 further comprising:
the amplitude of each pulse in the response signal being determined at least in part by the modification of the high frequency capacitive impedance across the capacitive gap due to the lack of presence of the finger in the vicinity of the capacitive gap.

5. The method of claim 2 further comprising:
setting a power consumption mode of operation of the biometric object imaging apparatus at least in part based on the determination of the presence of the biometric object.

6. The method of claim 4 further comprising:
setting a power consumption mode of operation of the biometric object imaging apparatus at least in part based on the determination of the absence of the biometric object.

7. The method of claim 1 further comprising:
the capacitive gap comprises a respective one the gaps between each of the plurality of transmitter electrodes and the single receiver electrode defining a pixel location at the location of the respective one of the gaps.

8. The method of claim 1 further comprising:
the capacitive gap comprises a respective one the gaps between each of the plurality of receiver electrodes and the single transmitter electrode defining a pixel location at the location of the respective one of the gaps.

9. The method of claim 1 further comprising:
the burst of high frequency pulses comprising a burst of RF pulses, transmitted across the capacitive gap from a transmitter electrode to a receiver electrode defining a pixel location at the gap between the transmitter electrode and the receiver electrode.

10. The method of claim 1 further comprising:
the biometric object comprises a finger and the biometric object imaging apparatus comprises a fingerprint imaging apparatus.

11. A biometric object sensor in a biometric object imaging apparatus, comprising:
   a probing signal generator configured to generate a probing signal and transmit the probing signal to a biometric object sensing area, comprising a capacitive gap between at least one of a plurality of transmitter electrodes and a single receiver electrode or at least one of a plurality of receiver electrodes and a single transmitter electrode, the probing signal comprising a burst of high frequency pulses, transmitted across the capacitive gap between the at least one of a transmitter electrode from the plurality of transmitter electrodes to the single receiver electrode or the at least one of a plurality of receiver electrodes from the single transmitter electrode;

a response signal receiver receiving a response signal on the respective receiver electrode in response to the probing signal, the response signal comprising a burst of high frequency pulses;

a reference signal generator generating an upper reference level signal for the amplitude of pulses in the burst of high frequency pulses comprising the response signal; and a signal processor configured to monitor whether the peaks of the response signal exceed the upper reference level to determine the presence of the biometric object in the biometric object sensing area due to the presence of the biometric object modifying the amplitude of the pulses in the burst of high frequency pulses in the response signal from the amplitude of the pulses in the probing signal.

12. The sensor of claim 11 further comprising:
the amplitude of each pulse in the response signal being determined at least in part by the modification of the high frequency capacitive impedance across the capacitive gap due to the presence of the biometric object in the vicinity of the capacitive gap.

13. The sensor of claim 11 further comprising:
a reference signal generator generating a lower reference signal; and
the signal processor monitoring whether the peaks of the response signal are below the lower reference level to determine the absence of the biometric object from the biometric object sensing area due to the lack of presence of the biometric object modifying the amplitude of the pulses in the high frequency response signal.

14. The sensor of claim 11 further comprising:
the amplitude of each pulse in the response signal being determined at least in part by the modification of the high frequency capacitive impedance across the capacitive gap due to the lack of presence of the biometric object in the vicinity of the capacitive gap.

15. The sensor of claim 12 further comprising:
a computing device configured to set a power consumption mode of operation of the biometric object imaging apparatus at least in part based on the determination of the presence of the biometric object.

16. The sensor of claim 14 further comprising:
a computing device configured to set a power consumption mode of operation of the biometric object imaging apparatus at least in part based on the determination of the absence of the biometric object.

17. The sensor of claim 11 further comprising:
the capacitive gap comprises a respective one the gaps between each of the plurality of transmitter electrodes and the single receiver electrode defining a pixel location at the location of the respective one of the gaps.

18. The sensor of claim 11 further comprising:
the capacitive gap comprises a respective one the gaps between each of the plurality of receiver electrodes and the single transmitter electrode defining a pixel location at the location of the respective one of the gaps.

19. The sensor of claim 11 further comprising:
the burst of high frequency pulses comprising a burst of RF pulses, transmitted across the capacitive gap from a transmitter electrode to a receiver electrode defining a pixel location at the gap between the transmitter electrode and the receiver electrode.

20. A non-transitory machine readable medium storing instructions that, when executed by a computing device, cause the computing device to perform a method, the method comprising:

transmit a probing signal to a biometric object sensing area, comprising a capacitive gap between at least one of a plurality of transmitter electrodes and a single receiver electrode or at least one of a plurality of receiver electrodes and a single transmitter electrode, the probing signal comprising a burst of high frequency pulses, transmitted across the capacitive gap between the transmitter electrode of the plurality of transmitter electrodes to the single receiver electrode or to the receiver electrode of the plurality of receiver electrodes from the single transmitter electrode;

receive a response signal on the respective receiver electrode in response to the probing signal, the response signal comprising a burst of high frequency pulses;

establish an upper reference level for the amplitude of pulses in the burst of high frequency pulses comprising the response signal; and monitor whether the peaks of the response signal exceed the upper reference level to determine the presence of the biometric object in the biometric object sensing area due to the presence of the biometric object modifying the amplitude of the pulses in the burst of high frequency pulses in the response signal from the amplitude of the pulses in the probing signal.

* * * * *